United States Patent
Nishikawa et al.

[11] Patent Number: 5,573,822
[45] Date of Patent: Nov. 12, 1996

[54] CROSSLINKED TUBE AND HEAT-SHRINKABLE TUBE

[75] Inventors: Shinya Nishikawa; Hiroshi Hayami, both of Osaka, Japan

[73] Assignee: Sumitomo Electric Industries, Ltd., Osaka, Japan

[21] Appl. No.: 378,098

[22] Filed: Jan. 26, 1995

Related U.S. Application Data

[63] Continuation of Ser. No. 100,924, Aug. 3, 1993, abandoned.

[30] Foreign Application Priority Data

Aug. 5, 1992 [JP] Japan .................................. 4-227793

[51] Int. Cl.⁶ .................................................. B29D 23/00
[52] U.S. Cl. .................. 428/36.9; 428/36.91; 428/36.92
[58] Field of Search .............................. 428/34.9, 35.1, 428/520, 522, 36.9, 36.91, 36.92

[56] References Cited

U.S. PATENT DOCUMENTS

| | | | |
|---|---|---|---|
| 4,915,139 | 4/1990 | Landry et al. | 138/125 |
| 5,179,168 | 1/1993 | Hirasawa | 525/221 |
| 5,209,983 | 5/1993 | Case et al. | 428/514 |

FOREIGN PATENT DOCUMENTS

| | | |
|---|---|---|
| 0259246 | 3/1988 | European Pat. Off. . |
| 0273341 | 7/1988 | European Pat. Off. . |
| 04093340 | 3/1993 | Japan . |

OTHER PUBLICATIONS

European Search Report, Communication, and Annex for EP 93 11 2519.
Rose, Condensed Chemical Dictionary, 1966, p. 510.

*Primary Examiner*—James J. Seidleck
*Assistant Examiner*—Michael A. Williamson
*Attorney, Agent, or Firm*—Sughrue, Mion, Zinn, Macpeak & Seas

[57] ABSTRACT

A crosslinked tube and heat-shrinkable tube, which each comprises an ionomer resin composition layer, the ionomer resin composition layer comprising (a) an ionomer resin having a structure in which a copolymer of ethylene and acrylic or methacrylic acid has been intermolecularly crosslinked with potassium ions and (b) an ionomer resin having a structure in which a copolymer of ethylene and acrylic or methacrylic acid has been intermolecularly crosslinked with sodium ions or/and zinc ions, the proportion of the ionomer resin (a) to the ionomer resin (b) being from 100/0 to 50/50 by weight. A heat-shrinkable tube, which comprises the ionomer resin composition layer having on the inner surface thereof an adhesive layer.

5 Claims, 1 Drawing Sheet

CROSSLINKED TUBE AND HEAT-SHRINKABLE TUBE

This is a continuation of application Ser. No. 08/100,924 filed Aug. 3, 1993.

FIELD OF THE INVENTION

The present invention relates to a crosslinked tube and a heat-shrinkable tube which are colorless and excellent in clarity. The present invention also relates to a heat-shrinkable tube which has an adhesive layer or pressure-sensitive adhesive layer on the inner surface thereof and is colorless and excellent in clarity.

BACKGROUND OF THE INVENTION

Tubes and heat-shrinkable tubes have conventionally been used extensively in applications such as the insulation or marring protection of terminals and junctions of electric wires and cables and the protection of joints of steel pipes and other various pipes against water, corrosion, etc.

Of such applications, those which require waterproofing and corrosion protection employ heat-shrinkable tubes having a pressure-sensitive adhesive layer or an adhesive layer, preferably an adhesive layer, formed on the inner surface thereof.

In some applications, there are cases where the inside of a tube or heat-shrinkable tube having been used for covering is required to be examined visually. For such applications, crosslinked tubes or heat-shrinkable tubes composed of transparent resins, such as a polyvinyl chloride resin, a polyethylene terephthalate resin, and an ionomer resin, are used.

However, the tubes and the heat-shrinkable tubes composed of a polyvinyl chloride resin occasionally have a problem of plasticizer migration. The heat-shrinkable tubes composed of a polyethylene terephthalate resin have a problem that during heat shrinkage operations, they not only shrink in the radial direction but shrink considerably in the lengthwise direction. Further, since the heat-shrinkable tubes composed of a polyethylene terephthalate resin have insufficient flexibility, they have problems, for example, that the handling thereof is difficult when they have large wall thicknesses.

Known ionomer resins for a crosslinked tube and heat-shrinkable tube have a structure in which a copolymer of ethylene and acrylic or methacrylic acid has been intermolecularly crosslinked with metal ions such as zinc ions or sodium ions.

For producing a crosslinked tube made of an ionomer resin, the ionomer resin is shaped into a tube using a melt extruder or the like and the tube is then crosslinked by irradiation with an ionizing radiation such as electron beams.

For producing a heat-shrinkable tube made of an ionomer resin, the ionomer resin is shaped into a tube using a melt extruder or the like, the tube is then crosslinked by irradiation with an ionizing radiation such as electron beams, and the diameter of the crosslinked tube is expanded under high-temperature conditions by, for example, introducing compressed air into the tube and is then fixed by cooling.

A heat-shrinkable tube made of an ionomer resin and having an adhesive layer on the inner surface thereof can be obtained in the same manner as in the production of the heat-shrinkable tube made of an ionomer resin alone, except that an adhesive resin, such as a polyamide, and the ionomer resin are shaped by melt co-extrusion.

The heat-shrinkable tube composed of a resin molding comprising an ionomer resin is free from the plasticizer migration problem accompanying the heat-shrinkable tubes of a polyvinyl chloride resin and from the problems of lengthwise shrinkage and handling difficulty due to insufficient flexibility accompanying the heat-shrinkable tubes of a polyethylene terephthalate resin.

However, the crosslinked tube or heat-shrinkable tube made of an ionomer resin and the heat-shrinkable tube made of an ionomer resin and having an adhesive layer on the inner surface thereof have had a problem that, in the production thereof, Lichtenberg discharge marks generate within the ionomer resin layer and/or at the interface between the heat-shrinkable ionomer resin tube layer and the adhesive layer during the step of electron beam irradiation, thereby to considerably impair the clarity and appearance of the product.

SUMMARY OF THE INVENTION

An object of the present invention is to provide a crosslinked tube and a heat-shrinkable tube which are colorless and excellent in clarity.

Another object of the present invention is to provide a heat-shrinkable tube which has an adhesive layer or pressure-sensitive adhesive layer on the inner surface thereof and is colorless and excellent in clarity.

Other objects and effects of the present invention will be apparent from the following description.

The present inventors made intensive studies in order to overcome the above-described prior art problem. As a result, it has been found that even in the case of producing a crosslinked or heat-shrinkable tube comprising an ionomer resin or producing a heat-shrinkable tube comprises an ionomer resin and having an adhesive layer or pressure-sensitive adhesive layer formed on the inner surface thereof, irradiation of the tubes with electron beams does not result in generation of Lichtenberg discharge marks, if the crosslinked or heat-shrinkable tubes comprises an ionomer resin composition comprising an ionomer resin having a structure in which a copolymer of ethylene and acrylic or methacrylic acid has been intermolecularly crosslinked with potassium ions and an ionomer resin having a structure in which the same copolymer as above has been intermolecularly crosslinked with sodium ions or/and zinc ions, with the prescribed proportion. The present invention has been completed based on this finding.

The present invention relates to a crosslinked tube comprising an ionomer resin composition layer, the ionomer resin composition layer comprising (a) an ionomer resin having a structure in which a copolymer of ethylene and acrylic or methacrylic acid has been intermolecularly crosslinked with potassium ions and (b) an ionomer resin having a structure in which a copolymer of ethylene and acrylic or methacrylic acid has been intermolecularly crosslinked with sodium ions or/and zinc ions, the proportion of the ionomer resin (a) to the ionomer resin (b) being from 100/0 to 50/50 by weight.

The present invention also relates to a heat-shrinkable tube comprising the above ionomer resin composition layer.

The present invention relates to, as a preferred embodiment, a heat-shrinkable tube comprising the above ionomer resin composition layer and further comprising an adhesive layer on the inner surface thereof. The adhesive layer preferably comprises an ethylene-ethyl acrylate-carbon monoxide copolymer.

DESCRIPTION OF PREFERRED EMBODIMENTS

Figure 1:
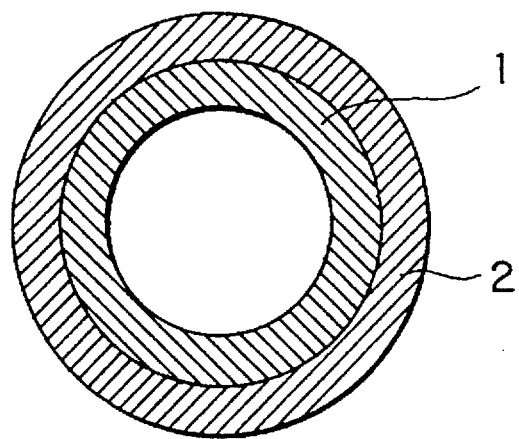
FIG. 1 is a schematic cross-sectional view of one embodiment of the heat-shrinkable tube according to the present invention.

The ionomer resin composition layer used in the present invention comprises the ionomer resin (a) and the ionomer resin (b). The ionomer resin (a) has a structure in which a copolymer of ethylene and acrylic or methacrylic acid has been intermolecularly crosslinked with potassium ions, and the ionomer resin (b) has a structure in which a copolymer of ethylene and acrylic or methacrylic acid has been intermolecularly crosslinked with sodium ions or/and zinc ions.

The ionomer resin (a) preferably has a melt flow rate of from 0.1 to 5 and a melting point of from 80° to 110° C. The ionomer resin (b) preferably has a melt flow rate of from 0.1 to 10 and a melting point of from 80° to 110° C.

Examples of the ionomer resin (a) used in the present invention that has a structure in which a copolymer of ethylene and acrylic or methacrylic acid has been intermolecularly crosslinked with potassium ions include those described in JP-B-3-203902. (The term "JP-B" as used herein means an "examined Japanese patent publication".)

The proportion of the ionomer resin (a) to the ionomer resin (b) ((a)/(b)) is from 100/0 to 50/50 by weight, and preferably from 100/0 to 60/40 by weight.

If the proportion of the ionomer resin (a) in the ionomer resin composition is less than the above range, not only the generation of Lichtenberg discharge marks during crosslinking with an ionizing radiation cannot be prevented, but also the crosslinked or heat-shrinkable tube obtained has impaired clarity.

Various additives may be incorporated, if desired, into the ionomer resin composition used in the present invention. Examples thereof include an antioxidant, a light stabilizer, a heat stabilizer, a lubricant, a colorant, a crosslinking accelerator, a processing aid, and a filler. Examples of the antioxidant include amine series antioxidants and phenol series antioxidants, and the amount thereof is generally from 0.1 to 20% by weight, preferably from 0.5 to 10% by weight, based on the amount of the ionomer resin composition.

The method for producing the crosslinked tube according to the present invention is not particularly limited. For example, the ionomer resin composition is shaped into a tube using a melt extruder or the like and the tube is then crosslinked.

The crosslinking of the ionomer resin composition may be conducted by any conventional methods, e.g., by irradiation with an ionizing radiation, such as electron beams, γ-rays and X-rays, or by heating.

In the case where crosslinking is conducted by irradiation with an ionizing radiation, it is preferred to incorporate beforehand a crosslinking accelerator into the ionomer resin composition. Examples of the crosslinking accelerator include a polyfunctional allyl compound (e.g., triallyl isocyanurate and triallyl cyanurate) and a polyfunctional acrylic compound (e.g., trimethylolpropane trimethacrylate, ethylene glycol dimethacrylate and hexanediol diacrylate).

The amount of the crosslinking accelerator is generally from 0.1 to 20% by weight, preferably from 0.5 to 10% by weight, based on the amount of the ionomer resin composition. The dose of the ionizing radiation is generally from 10 to 1,000 kGy, and preferably from 50 to 500 kGy.

In the case where crosslinking is conducted by heating, a heat-decomposable crosslinking agent is generally incorporated into the ionomer resin composition. Examples of heat-decomposable crosslinking agent include dicumyl peroxide, bis(t-butyl peroxy iso-propyl)benzene, etc., and the amount thereof is generally from 0.1 to 5 parts by weight, and preferably from 0.5 to 3 parts by weight, per 100 parts by weight of the ionomer resin composition. Crosslinking is generally effected by heating the tube at a temperature higher than the decomposition point of the crosslinking agent. In case of dicumyl peroxide, for example, the tube is heated to 180° C. for 1 minute.

The method for producing the heat-shrinkable tube according to the present invention is not particularly limited. For example, the ionomer resin composition is shaped into a tube using a melt extruder or the like, the tube is then crosslinked, and the diameter of the crosslinked tube is expanded under high-temperature conditions by, for example, introducing compressed air into the tube and is then fixed by cooling.

The heat-shrinkable tube according to the present invention that has an adhesive layer on the inner surface thereof can be obtained in the same manner as above, except that an adhesive resin composition and the ionomer resin are shaped by melt co-extrusion.

FIG. 1 shows a schematic sectional view of one embodiment of the heat-shrinkable tube according to the present invention, in which numeral 1 denotes an adhesive layer and 2 denotes an ionomer resin composition layer.

The adhesive layer in the heat-shrinkable tube according to the present invention may comprise an adhesive resin composition or a pressure-sensitive adhesive composition.

Examples of the adhesive resin composition include any of various hot-melt adhesives generally employed. Preferred examples thereof include resin compositions comprising such hot-melt adhesives as thermoplastic polyamide resins, thermoplastic saturated copolyester resins, and the like produced by the polycondensation reactions of fatty acid polymers with polyethylene polyamines and various diamines, and resin compositions comprising such hot-melt adhesives as copolymers of ethylene, ethyl acrylate, and carbon monoxide. These resin compositions are advantageously used from the standpoint of bondability to metals and other various materials. The resin compositions comprising ethylene-ethyl acrylate-carbon monoxide copolymers are advantageously used from the standpoint of the water absorption, clarity, and coloring properties of the adhesive resin composition.

Examples of the pressure-sensitive adhesive composition include rubber adhesives such as natural rubber and butyl rubber, acrylic adhesives such as acrylic ester copolymers, vinyl adhesives such as alkyl vinyl ether copolymers, and silicone adhesives. These may be used alone or in combination of two or more thereof.

It is preferred that a crosslinking inhibitor is incorporated into the composition for the adhesive layer in order to prevent the composition from being crosslinked by irradiation with electron beams. Examples of the crosslinking inhibitor include t-butylhydroxytoluene, hydroquinone, methylhydroquinone, 2-t-butylhydroquinone and p-benzoquinone. The amount of the crosslinking inhibitor is generally from 0.01 to 10% by weight, preferably from 0.1 to 5% by weight, based on the amount of the ionomer resin composition.

A tackifier such as a terpene resin or an aromatic hydrocarbon resin may be incorporated into the compositions for the adhesive layer.

If desired, various additives, such as an antioxidant, lubricant, and flame retardant, may be incorporated into the adhesive layer. Examples of the antioxidant include amine series antioxidants and phenol series antioxidants, and the amount thereof is generally from b 0.1to 20% by weight, preferably from 0.5 to 10% by weight, based on the amount of the adhesive layer.

The adhesive layer generally has a thickness of from about 0.2 to about 3 mm depending on use.

The thickness of the ionomer resin composition layer of the crosslinked tube or heat-shrinkable tube according to the present invention is generally from 0.1 to 5 mm, and preferably from 0.2 to 3 mm. The inner diameter of the crosslinked tube or heat-shrinkable tube according to the present invention is generally from 0.5 to 100 mm, and preferably from 0.8 to 50 mm.

The ionomer resin (a) used in the present invention that has a structure in which the copolymer has been intermolecularly crosslinked with potassium ions is characterized as having a lower surface resistivity and a lower volume resistivity than conventional ionomer resins such as the ionomer resin (b) having a structure in which the polymers have been crosslinked with zinc ions or sodium ions.

It should, however, be noted that the surface resistivity and volume resistivity of the ionomer resin are not the only cause of the generation of Lichtenberg discharge marks. If the surface resistivity and volume resistivity of a conventional ionomer resin having the zinc ion- or sodium ion-crosslinked structure are lowered by incorporating an internal antistatic agent such as a surfactant, and the resulting resin composition is formed into a tube having an adhesive layer, irradiation of this tube with electron beams still results in generation of Lichtenberg discharge marks.

The present invention will be explained below in more detail with reference to the following examples, but the invention is not construed as being limited thereto. All the parts, percents and the like in the following Examples and Comparative Examples are by weight unless otherwise specifically indicated.

EXAMPLES 1 TO 10

The ionomer resin compositions as specified in Table 1 below were prepared, and tubes made of the ionomer resin compositions (inner diameter of tube: 8 mm; wall thickness: 1.5 mm) were formed using a melt extruder.

The ionomer resin compositions and adhesive compositions as specified in Table 2 below were prepared, and tubes made of the ionomer resin compositions having an adhesive layer on the inner surface thereof (inner diameter of tube: 8 mm; ionomer resin tube wall thickness: 0.5 mm; adhesive layer thickness: 1.0 mm) were formed using a melt co-extruder.

These tubes were irradiated with 100 kGy of electron beams at an accelerating voltage of 1 MV to obtain crosslinked tubes, which were then examined for Lichtenberg discharge marks, clarity, and color change. The results obtained are shown in Tables 1 and 2.

The tubes of Examples 1 to 10 shown in Tables 1 and 2 were thereafter placed in a 150° C. thermostatic chamber, where the diameter of each tube was expanded to an outer diameter of 20 mm by introducing compressed air into the tube. The expanded diameter was fixed by cooling. Thus, heat-shrinkable tubes were obtained.

The heat-shrinkable tubes obtained were colorless and had excellent clarity.

A polyvinyl chloride pipe having an outer diameter of 10 mm was inserted in each of the heat-shrinkable tubes of Examples 6 to 10 shown in Table 2, and the assembly was heated for 3 minutes at 120° C. in a thermostatic chamber. As a result, each tube thermally shrank to tightly fit the polyvinyl chloride pipe and was unable to be peeled off by hand.

TABLE 1

|  | Example 1 | Example 2 | Example 3 | Example 4 | Example 5 |
| --- | --- | --- | --- | --- | --- |
| Ionomer resin composition | Ionomer resin (1) | Ionomer resin (2) | Ionomer resin (1)/ Ionomer resin (3) = 50/50 | Ionomer resin (1)/ Ionomer resin (4) = 50/50 | Ionomer resin (1)/ Ionomer resin (3)/ Ionomer resin (4) = 50/25/25 |
| Lichtenberg discharge mark | none | none | none | none | none |
| Clarity | good | good | good | good | good |
| Color change | not colored | not colored | not colored | not colored | not colored |
| Surface resistivity of ionomer ($\Omega$) 26° C., 60% RH | $3.5 \times 10^{11}$ | $3.0 \times 10^{9}$ | $8.2 \times 10^{12}$ | $7.4 \times 10^{12}$ | $7.7 \times 10^{12}$ |
| Volume resistivity of ionomer ($\Omega \cdot$ cm) 26° C., 60% RH | $1.8 \times 10^{13}$ | $2.2 \times 10^{11}$ | $1.2 \times 10^{15}$ | $9.5 \times 10^{14}$ | $9.3 \times 10^{14}$ |

TABLE 2

| | Example 6 | Example 7 | Example 8 | Example 9 | Example 10 |
|---|---|---|---|---|---|
| Ionomer resin composition | Ionomer resin (1) | Ionomer resin (1) | Ionomer resin (2) | Ionomer resin (1)/ Ionomer resin (3) = 50/50 | Ionomer resin (1)/ Ionomer resin (4) = 50/50 |
| Resin composition for adhesive layer | Copolymer (5) | Polyamide resin (6) | Copolymer (5) | Copolymer (5) | Copolymer (5) |
| Lichtenberg discharge mark | none | none | none | none | none |
| Clarity | good | good | good | good | good |
| Color change | not colored | slightly yellowed | not colored | not colored | not colored |
| Surface resistivity of ionomer ($\Omega$) 26° C., 60% RH | $3.5 \times 10^{11}$ | $3.5 \times 10^{11}$ | $3.0 \times 10^{9}$ | $8.2 \times 10^{12}$ | $7.4 \times 10^{12}$ |
| Volume resistivity of ionomer ($\Omega \cdot$ cm) 26° C., 60% RH | $1.8 \times 10^{13}$ | $1.8 \times 10^{13}$ | $2.2 \times 10^{11}$ | $1.2 \times 10^{15}$ | $9.5 \times 10^{14}$ |

The ionomer resins and the resin compositions for the adhesive layer used in Examples 1 to 10 are as follows.

Ionomer resin (1):

Copolymer of ethylene and acrylic acid

Melt flow rate: 0.7,

Melting point: 94° C.,

Metal ion: potassium ion

Ionomer resin (2):

Copolymer of ethylene and acrylic acid

Melt flow rate: 0.1,

Melting point: 101° C.,

Metal ion: potassium ion

Ionomer resin (3):

Copolymer of ethylene and acrylic acid

Melt flow rate: 0.7,

Melting point: 88° C.,

Metal ion: zinc ion

Ionomer resin (4):

Copolymer of ethylene and acrylic acid

Melt flow rate: 0.1,

Melting point: 101° C.,

Metal ion: sodium ion

In ionomer resins (1) to (4), 1 part by weight of a phenol series antioxidant (Irganox 1010, a trade name, manufactured by Ciba-Geigy A.G.) was incorporated into 100 parts by weight of each ionomer resin.

Copolymer (5):

Ethylene-ethyl acrylate-carbon monoxide copolymer

Melt flow rate: 50 (150° C. 2,160 g load)

3 Parts by weight of t-butylhydroxytoluene as a crosslinking inhibitor was incorporated into 100 parts by weight of the ethylene-ethyl acrylate-carbon monoxide copolymer.

Polyamide resin (6):

Thermoplastic polyamide resin

Melt viscosity: 30 to 60 poise at 210° C.

softening point: 125° C.

3 Parts by weight of t-butylhydroxytoluene as a crosslinking inhibitor was incorporated into 100 parts by weight of a thermoplastic polyamide resin.

COMPARATIVE EXAMPLES 1 TO 11

The crosslinked tubes of Comparative Examples 1 to 11 were prepared in the same manner as in Examples 1 to 10 except that the ionomer resin composition and the adhesive compositions as specified in Tables 3, 4, and 5 below were used. The resulting crosslinked tubes were examined for Lichtenberg discharge marks, clarity, and color change. The results obtained are shown in Tables 3, 4, and 5.

TABLE 3

| | Comparative Example 1 | Comparative Example 2 | Comparative Example 3 | Comparative Example 4 |
|---|---|---|---|---|
| Ionomer resin composition | Ionomer resin (3) | Ionomer resin (4) | Ionomer resin (1)/ Ionomer resin (3) = 40/60 | Ionomer resin (1)/ Ionomer resin (4) = 40/60 |
| Lichtenberg discharge mark | present | present | present | present |
| Clarity | poor | poor | poor | poor |
| Color change | not colored | not colored | not colored | not colored |
| Surface resistivity of ionomer ($\Omega$) 26° C., 60% RH | $9.2 \times 10^{14}$ | $4.5 \times 10^{14}$ | $6.2 \times 10^{13}$ | $5.3 \times 10^{13}$ |
| Volume resistivity of ionomer ($\Omega \cdot$ cm) 26° C., 60% RH | $8.8 \times 10^{16}$ | $6.4 \times 10^{16}$ | $7.4 \times 10^{15}$ | $6.6 \times 10^{15}$ |

TABLE 4

|  | Comparative Example 5 | Comparative Example 6 | Comparative Example 7 | Comparative Example 8 | Comparative Example 9 |
|---|---|---|---|---|---|
| Ionomer resin composition | Ionomer resin (3) | Ionomer resin (4) | Ionomer resin (3a) with anti-static agent | Ionomer resin (3b) with anti-static agent | Ionomer resin (3a) with anti-static agent |
| Resin composition for adhesive layer | Copolymer (5) | Polyamide resin (6) | Polyamide resin (6) | Copolymer (5) | Copolymer (5) |
| Lichtenberg discharge mark | present | present | present | present | present |
| Clarity | poor | poor | poor | poor | poor |
| Color change | not colored | not colored | not colored | not colored | not colored |
| Surface resistivity of ionomer ($\Omega$) 26° C., 60% RH | $9.2 \times 10^{14}$ | $4.5 \times 10^{14}$ | $9.2 \times 10^{10}$ | $2.1 \times 10^{11}$ | $9.2 \times 10^{10}$ |
| Volume resistivity of ionomer ($\Omega \cdot$ cm) 26° C., 60% RH | $8.8 \times 10^{16}$ | $6.4 \times 10^{16}$ | $1.2 \times 10^{13}$ | $3.2 \times 10^{12}$ | $1.25 \times 10^{13}$ |

TABLE 5

|  | Comparative Example 10 | Comparative Example 11 |
|---|---|---|
| Ionomer resin composition | Ionomer resin (1)/ Ionomer resin (3) = 40/60 | Ionomer resin (1)/ Ionomer resin (4) = 40/60 |
| Resin composition for adhesive layer | Copolymer (5) | Copolymer (5) |
| Lichtenberg discharge mark | present | present |
| Clarity | poor | poor |
| Color change | not colored | not colored |
| Surface resistivity of ionomer ($\Omega$) 26° C., 60% RH | $6.2 \times 10^{13}$ | $5.3 \times 10^{13}$ |
| Volume resistivity of ionomer ($\Omega \cdot$ cm) 26° C., 60% RH | $7.4 \times 10^{15}$ | $6.6 \times 10^{15}$ |

The ionomer resin compositions used in Comparative Examples 7 to 9 are as follows.

Ionomer resin (3a):

Ionomer resin (3) added with 2 parts by weight of an internal antistatic agent (Resistat PE132, trade name, manufactured by Dai-ich Kogyo K.K., Japan) per 100 parts by weight of ionomer resin (3)

Ionomer resin (3b):

Ionomer resin (3) added with 2 parts by weight of an internal antistatic agent (Electro Stripper TS2B, trade name, manufactured by Kao Corp., Japan) per 100 parts by weight of ionomer resin (3)

As apparent from Table 1, the heat-shrinkable tubes of Examples 1, 2, 6, 7, and 8, in which the heat-shrinkable tubes were made of a potassium ion-crosslinked ionomer alone, and the heat-shrinkable tubes of Examples 3, 4, 5, 9, and 10, in which the heat-shrinkable tubes were made of a mixture of a potassium ion-crosslinked ionomer and a conventional ionomer with the proportion of the former to the latter being from 100/0 to 50/50 by weight, had not developed Lichtenberg discharge marks upon electron beam irradiation. Thus, heat-shrinkable tubes excellent in clarity and appearance were produced.

In Examples 6 to 10, heat-shrinkable tubes having an adhesive layer on the inner surface thereof were obtained.

The results further show that the heat-shrinkable tubes of Examples 6, 8, 9, and 10, which employed as an adhesive layer an adhesive resin composition comprising an ethylene-ethyl acrylate-carbon monoxide copolymer, had an advantage of coloring properties.

In contrast, the heat-shrinkable tubes of Comparative Examples 1, 2, 5, and 6, which employed a conventional ionomer resin crosslinked with zinc ions or sodium ions, had developed Lichtenberg discharge marks upon electron beam irradiation and, hence, had poor clarity.

The heat-shrinkable tubes of Comparative Examples 3 and 4, which employed a mixture of a potassium ion-crosslinked ionomer and a sodium ion- or zinc ion-crosslinked ionomer in a weight ratio of 40/60, which is outside the scope of the present invention, each had developed Lichtenberg discharge marks.

Further, the heat-shrinkable tubes of Comparative Examples 7 to 9, in each of which an internal antistatic agent had been incorporated in the ionomer resin composition so as to reduce the surface resistivity and volume resistivity of the resin to values on or below the levels of surface resistivity and volume resistivity for the ionomer resin compositions used in Examples 1 to 10, also had developed Lichtenberg discharge marks upon electron beam irradiation. This shows that the potassium ion-crosslinked ionomer resin, use of which is essential to the present invention, produces a peculiar excellent effect in preventing the generation of Lichtenberg discharge marks.

According to the present invention, a crosslinked tube and a heat-shrinkable tube both of which are made of an ionomer resin and are colorless and excellent in clarity can be obtained, and a heat-shrinkable tube which is based on an ionomer resin, has an adhesive layer, and is colorless and excellent in clarity can be obtained. Furthermore, the tubes of the present invention are free from the problem of plasticizer migration. Therefore, the present invention is of great value in the field of applications of tubes and heat-shrinkable tubes.

While the invention has been described in detail and with reference to specific embodiments thereof, it will be apparent to one skilled in the art that various changes and modifications can be made therein without departing from the spirit and scope thereof.

What is claimed is:

1. A heat-shrinkable Lichtenberg discharge marks free tube comprising a crosslinked ionomer resin composition layer, said ionomer resin layer being crosslinked by electron beam irradiation and consisting essentially of a blend of (a) an ionomer resin having a structure in which a copolymer of ethylene and acrylic or methacrylic acid has been intermolecularly crosslinked with potassium ions and (b) an ionomer resin having a structure in which a copolymer of ethylene and acrylic or methacrylic acid has been intermolecularly crosslinked with one or both of sodium ions and zinc ions, the proportion of said ionomer resin (a) to said ionomer resin (b) being from 100/0 to 50/50 by weight.

2. A heat-shrinkable tube as claimed in claim 1, wherein the proportion of said ionomer resin (a) to said ionomer resin (b) is from 100/0 to 60/40.

3. A heat-shrinkable tube as claimed in claim 1, further comprising an adhesive layer on the inner surface of said ionomer resin composition layer.

4. A heat-shrinkable tube as claimed in claim 3, wherein the adhesive layer comprises a resin composition containing an ethylene-ethyl acrylate-carbon monoxide copolymer.

5. A heat-shrinkable tube as claimed in claim 1, wherein the tube is clear, colorless, and transparent.

* * * * *